United States Patent [19]
Hosokawa et al.

[11] Patent Number: 6,009,105
[45] Date of Patent: Dec. 28, 1999

[54] MULTIPLEX COMMUNICATION SYSTEM FOR VEHICLE

[75] Inventors: Kiyoshi Hosokawa, Tokyo; Nobuhiro Imaizumi; Tatsuaki Oniishi, both of Shizuoka, all of Japan

[73] Assignee: Yazaki Corporation, Tokyo, Japan

[21] Appl. No.: 08/671,647

[22] Filed: Jun. 28, 1996

[30] Foreign Application Priority Data

Jun. 30, 1995 [JP] Japan ................................. 7-166489

[51] Int. Cl.$^6$ ............................ H04L 12/43; H04B 7/212
[52] U.S. Cl. ............................ 370/458; 370/442; 701/36
[58] Field of Search .................................. 370/438, 442, 370/447, 458, 461, 462; 701/36, 49

[56] References Cited

U.S. PATENT DOCUMENTS

| | | | |
|---|---|---|---|
| 4,578,591 | 3/1986 | Floyd et al. | 307/10 |
| 4,736,367 | 4/1988 | Wroblewski et al. | 370/85 |
| 4,907,222 | 3/1990 | Slavik | 370/85.7 |
| 4,942,571 | 7/1990 | Moller et al. | 370/85.1 |
| 4,969,082 | 11/1990 | Oho et al. | 364/138 |
| 5,081,586 | 1/1992 | Barthel et al. | 364/424.05 |
| 5,305,316 | 4/1994 | Yoshida et al. | 370/85.1 |
| 5,343,472 | 8/1994 | Michihira et al. | 370/85.6 |

FOREIGN PATENT DOCUMENTS

| | | | |
|---|---|---|---|
| 0 307 344 | 3/1989 | European Pat. Off. | B60R 16/02 |
| 0 430 792 | 6/1991 | European Pat. Off. | B60R 16/02 |
| 0 451 825 | 10/1991 | European Pat. Off. | B60R 16/02 |
| 0 504 549 | 9/1992 | European Pat. Off. | H04L 12/28 |

*Primary Examiner*—Douglas W. Olms
*Assistant Examiner*—David R Vincent
*Attorney, Agent, or Firm*—Sughrue, Mion, Zinn, Macpeak & Seas, PLLC

[57] ABSTRACT

In a multiplex communication system for a bus vehicle, including: a plurality of loads disposed in the bus vehicle and connected to a wire harness; a switch unit for inputting signals to operate the loads and generating multiplex data; a first load drive unit for controlling the loads placed mainly on a floor of the bus vehicle; and a second load drive unit for controlling the loads placed mainly on a ceiling of the bus vehicle, the multiplex communication system further includes a multiplex line interconnecting the switch unit, the first load drive unit and the second load drive unit, and transmitting the multiplex data to the first and second load drive units to execute a multiplex communication, each the first and second load drive units controlling the loads in accordance with the multiplex data received through the multiplex line from the switch unit. The wire harness can be formed with high assembling performance or productivity in the bus vehicle.

2 Claims, 15 Drawing Sheets

FIG. 5A

| | |
|---|---|
| 1c1 → | FLAG B |
| 1c2 → | FLAG C |
| 1c3 → | FLAG D |
| 1c4 → | FLAG RXB |
| 1c5 → | FLAG RXC |
| 1c6 → | TRANSMISSION/ RECEPTION END FLAG |
| 1c7 → | TIMER |

| |
|---|
| FLAG A |
| FLAG C |
| FLAG D |
| FLAG RXA |
| FLAG RXC |
| TRANSMISSION/ RECEPTION END FLAG |
| TIMER |

| |
|---|
| FLAG A |
| FLAG B |
| FLAG D |
| FLAG RXA |
| FLAG RXB |
| TRANSMISSION/ RECEPTION END FLAG |
| TIMER |

(1c)

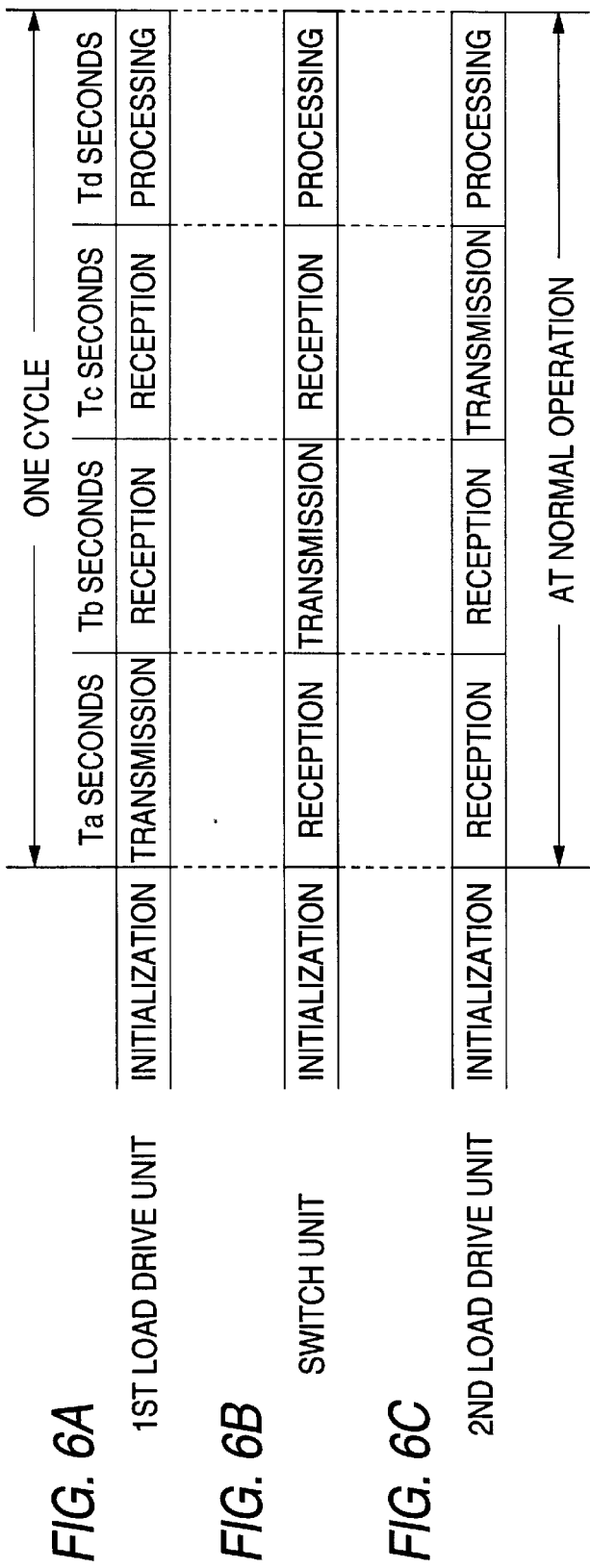

MULTIPLEX COMMUNICATION SYSTEM FOR VEHICLE

BACKGROUND OF THE INVENTION

The present invention relates to a multiplex communication system for a vehicle, and more particularly to a multiplex communication system for a vehicle in which a large number of loads mounted on the vehicle are integrated into a plurality of units which are multiplexed for saving lines between the units.

Generally, in a vehicle, loads such as various kinds of lamps and motors are arranged dispersedly in parts of the vehicle, operation switches for operating the loads are disposed in the vicinity of a driver's seat, and the operation switches and the loads corresponding thereto are interconnected to each other by signal lines. Since recent vehicles mount a large number of loads, the number of signal lines increases and the diameter and weight of a wire harness (WH) bundling the signal and power lines also become large; work for wiring the wire harness in the vehicle becomes extremely burdensome and the vehicle weight also increases.

A conventional multiplex communication system has been proposed in that the operation switches disposed in the vicinity of a driver's seat are integrated into a single switch unit close to the driver's seat. Further, the loads arranged dispersedly in the parts of the vehicle are divided into front and rear groups of the vehicle in which each load of the two groups is integrated into a load drive unit arranged on the vehicle floor corresponding to the respective groups. In addition, the load drive units are interconnected by a multiplex line. With the proposed conventional system, a communication between the units can be made via the multiplex line for operating the corresponding load in response to an input signal from a specific operation switch, so that the number of lines of the wire harness which must be wired for connecting the operation switches and loads is drastically reduced.

The loads integrated into each load drive unit are connected to each other by the power and signal lines. On the other hand, with the proposed system, the loads are grouped on the front and rear of the vehicle and both the load drive units for integrating and connecting the grouped loads are arranged on the vehicle floor.

Thus, particularly in a bus vehicle arranging a large number of illuminating lamps and the like on the ceiling, the number of lines of a wire harness bundling power and signal lines increases and becomes bulky for connecting a large number of loads disposed on the front and rear of the ceiling to each load drive unit. In addition, the wire harness must be wired between the ceiling and floor.

However, a place for wiring the wire harness between the ceiling and floor is limited to specific places such as the wall faces of the vehicle; particularly the bus has a structure with the vehicle wall faces formed with a large number of glass windows, so that it is difficult to form the wire harness wired between the ceiling loads divided on the front and rear of the vehicle and the units disposed on the vehicle floor with high assembling performance or productivity.

SUMMARY OF THE INVENTION

It is an object of the present invention to provide a multiplex communication system for a vehicle, so that wire harnesses can be formed with high assembling performance or productivity even in a bus vehicle mounting a large number of loads on the ceiling.

According to the present invention, there is provided a multiplex communication system for a vehicle including a plurality of loads disposed in the vehicle and connected to a wire harness, a switch unit for inputting signals to operate the loads and generating multiplex data, a first load drive unit for controlling the loads placed mainly on a floor of the vehicle, a second load drive unit for controlling the loads placed mainly on a ceiling of the vehicle, and a multiplex line interconnecting the switch unit, the first load drive unit and the second load drive unit, and transmitting the multiplex data to the first and second load drive units to execute a multiplex communication, each the first and second load drive units controlling the loads in accordance with the multiplex data received through the multiplex line from the switch unit.

The switch unit and the first load drive unit may be disposed in the switch box at the side of the driver's seat, and the second load drive unit may be fitted into a ceiling part to the rear of the driver's seat.

With the above structure, the switch unit inputs the operation signals of the operation switches integrated into the switch box at the side of the bus driver's seat for operating loads disposed in parts of a bus vehicle. Then, the switch unit generates multiplex date and transmits the data to the first and second load drive units via the multiplex lines. The first load drive unit receives the multiplex data from the switch unit and controls the corresponding loads mainly placed on the floor and connected by a wire harness. The second load drive unit, which receives the multiplex data from the switch unit and controls the corresponding loads mainly placed on the floor and connected by a wire harness, is fitted into a ceiling part.

Accordingly, the switch unit which inputs the operation signals of the operation switches integrated into the switch box at the side of the bus driver's seat and generates multiplex data and the second load drive unit are connected by multiplex lines. Furthermore, the loads placed mainly on the ceiling and to be controlled are connected to the second load drive unit fitted in the ceiling part. Thus, the wire harness connecting the load drive unit and the loads placed on the ceiling is mainly wired in ceiling parts and need not be wired between the ceiling and floor.

Particularly, since the switch unit and the first load drive unit are disposed in the switch box at the side of the driver's seat and the second load drive unit is fitted in a ceiling part to the rear of the driver'seat, therefore, a separate place for placing the first load unit need not be provided and the multiplex lines connecting the switch unit and the first and second load drive units can be shortened.

BRIEF DESCRIPTION OF THE DRAWINGS

In the accompanying drawings:

FIG. 5A to 5C are illustrations showing the format of the RAM areas in the units in FIG. 4;

FIGS. 6A to 6C are illustrations for explaining outlined operation of the multiplex communication system for a vehicle in FIG. 1;

DETAILED DESCRIPTION OF THE PREFERRED EMBODIMENT

Referring now to the accompanying drawings, there is shown a preferred embodiment of the present invention.

Figure 1:
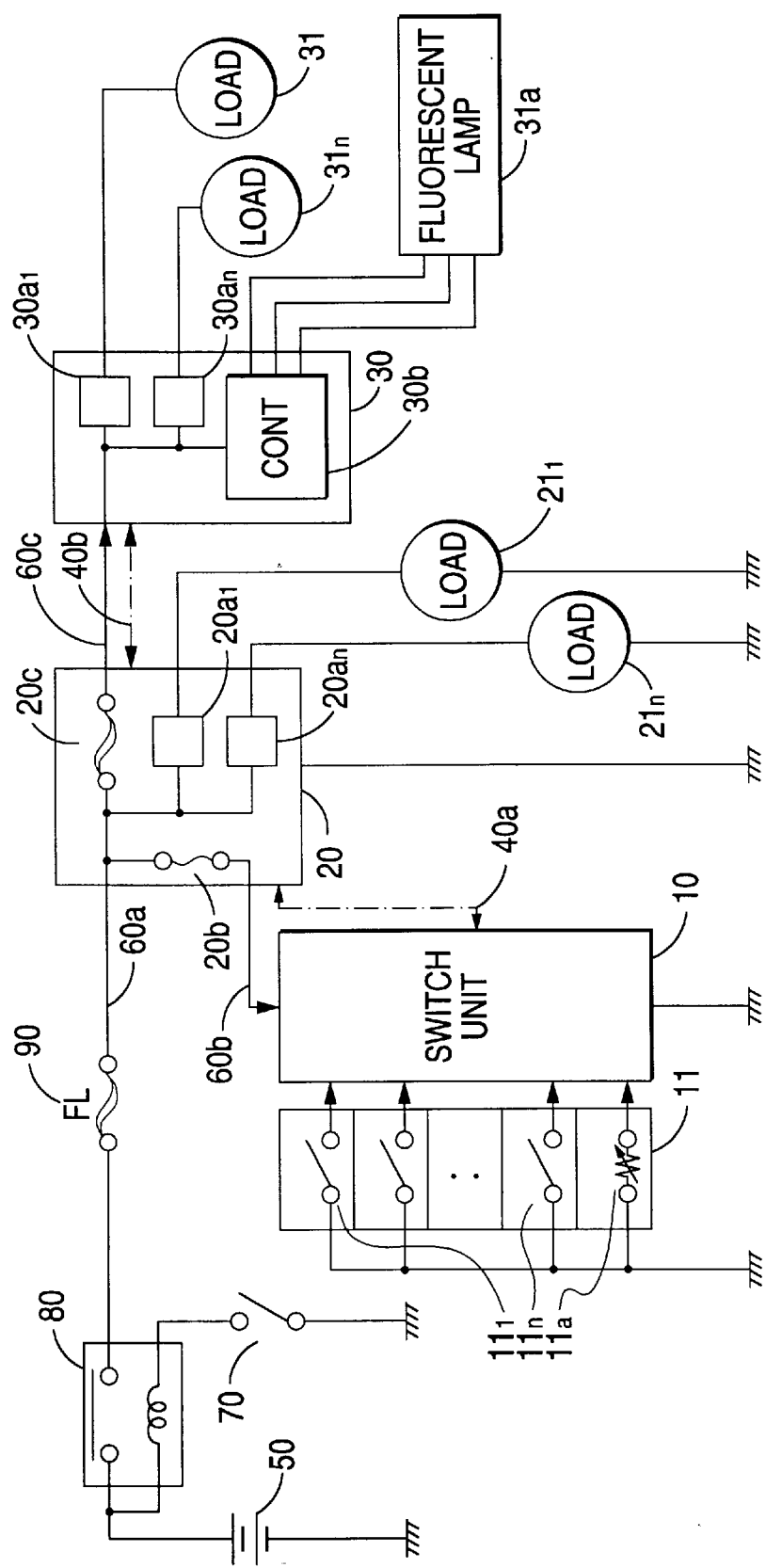
FIG. 1 is a diagram showing an embodiment of a multiplex communication system for a vehicle according to the invention.

In FIG. 1 a multiplex communication system includes three units of a switch unit 10, a first load drive unit 20 and a second load drive unit 30, multiplex lines 40a and 40b for interconnecting these units and executing intercommunication among the units, a battery 50 for supplying power to the units 10, 20 and 30, and power lines 60a to 60c wired between the battery 50 and the first load drive unit 20, between the first load drive unit 20 and the switch unit 10, and between the first and second load drive units 20 and 30, respectively. A battery relay 80 turned on/off by a battery relay switch 70 and a fusible link (FL) 90 are inserted in the power line 60a closed to the battery 50.

An operation input device 11 such as various operation switches $11_1$ to $11n$ and a dimming volume $11a$ are connected to the switch unit 10. After inputting operation signals of the operation input device 11 and converting the signals into multiplex communication data, the switch unit 10 executes communication with the first and second load drive units 20 and 30.

The first load drive unit 20 has switching devices $20a_1$ to $20an$ to which loads $21_1$ to $21_n$ of electrical components around the floor of a bus vehicle are connected, respectively. The loads $21_1$ to $21n$ are connected to the power line $60a$ via the switching devices $20a_1$ to $20an$. The switching devices $20a_1$ to $20an$ are controlled on/off according to switch signal data from the switch unit 10, so that the operation of related loads is controlled. The state of each control switch (not shown) required for control is input to the first load drive unit 20. The first load drive unit 20 also has a fuse $20b$ inserted between the power lines $60b$ and $60a$ and a fuse $20c$ inserted between the power lines $60c$ and $60a$.

The second load drive unit 30 has switching devices $30a_1$ to $30an$ to which loads $31_1$ to $31n$ of electrical components on the periphery of the coiling are connected, respectively, and a dimming control circuit $30b$ to which lighting fixtures permitted to dim on the periphery of the ceiling, such as fluorescent lamps $31a$, are connected. The loads $31_1$ to $31n$ and the fluorescent lamps $31a$ are connected to the power line $60a$ via the switching devices $30a_1$, to $30an$ and the dimming control circuit $30b$, respectively. The switching devices $30a_1$, to $30an$ are controlled on/off and the dimming control circuit $30b$ is controlled in dimming by multiplex signals received from the first load drive unit 20, so that the operation of related loads is controlled.

The loads connected to the first load drive unit 20 are listed as follows:

| | | |
|---|---|---|
| AV machines | Step light | Diagram indicator |
| Get-off sign | Fare box light | Passage light |
| TAIL | Microphone | Others |

The loads connected to the second load drive unit 30 are listed as follows:

| | | |
|---|---|---|
| Diagram indicator | Glass heater | Ventilating fan |
| Mirror remote control | Night lights | Room lights |
| Diagram indicator | Chandelier | Reading lights |
| Others | | |

Figure 2:
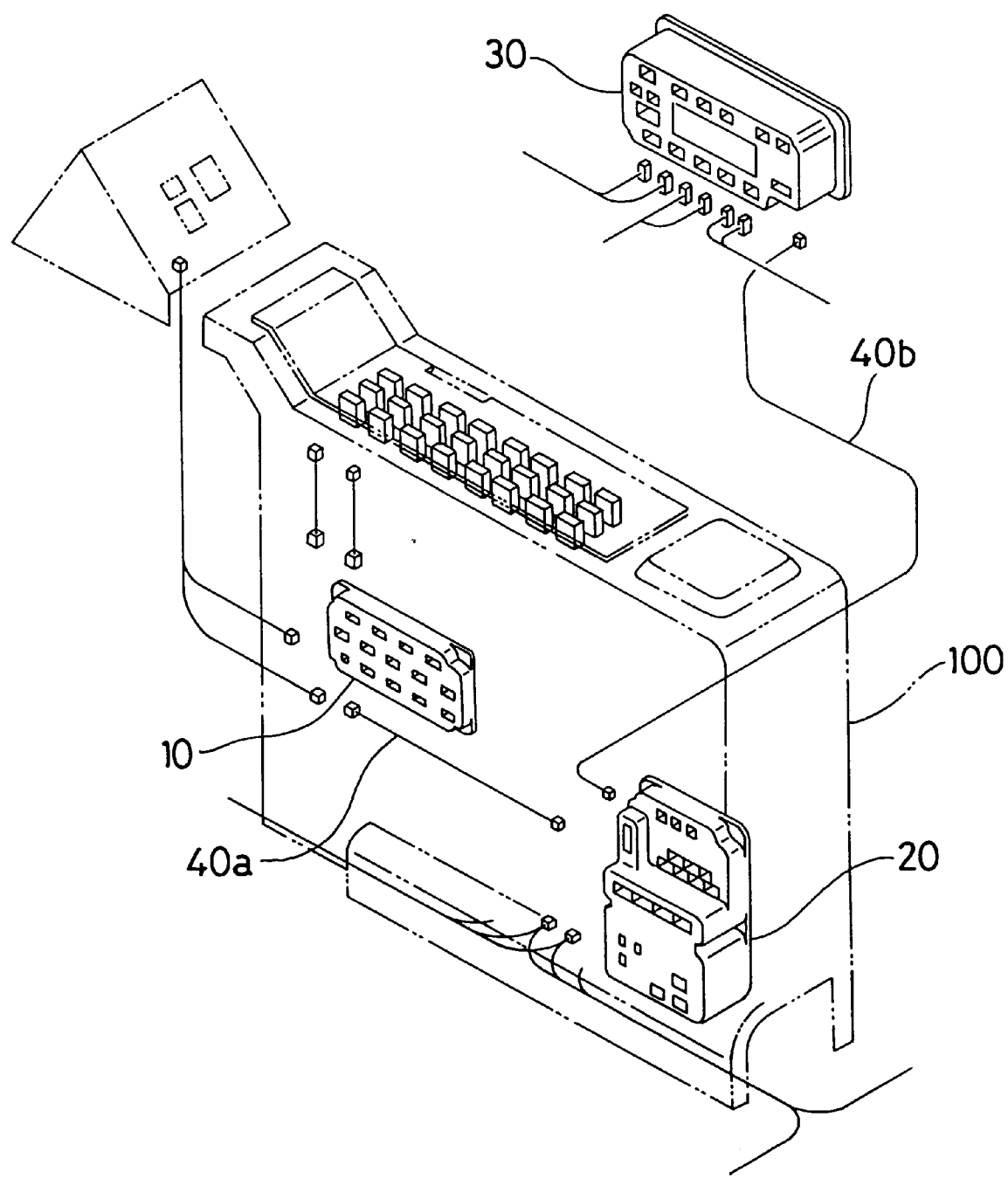
FIG. 2 is an illustration showing a layout example of units in the multiplex communication system for a vehicle in FIG. 1.

As shown in FIG. 2, the system inputs operation switches SW integrated into a switch box 100 at the side of a bus driver's seat through the switch unit 10 and controls respective loads by the first load drive units 20 located in the box 100 and the second load drive unit 30 located on the ceiling using multiplex communication. The switch unit 10, which is fitted in the switch box 100 on the right of the driver's seat, inputs external switch signals generated by operating the switches and volumes disposed on a switch panel SP and transmits data to the first and second load drive units 20 and 30 on multiplex communication.

Figure 3:
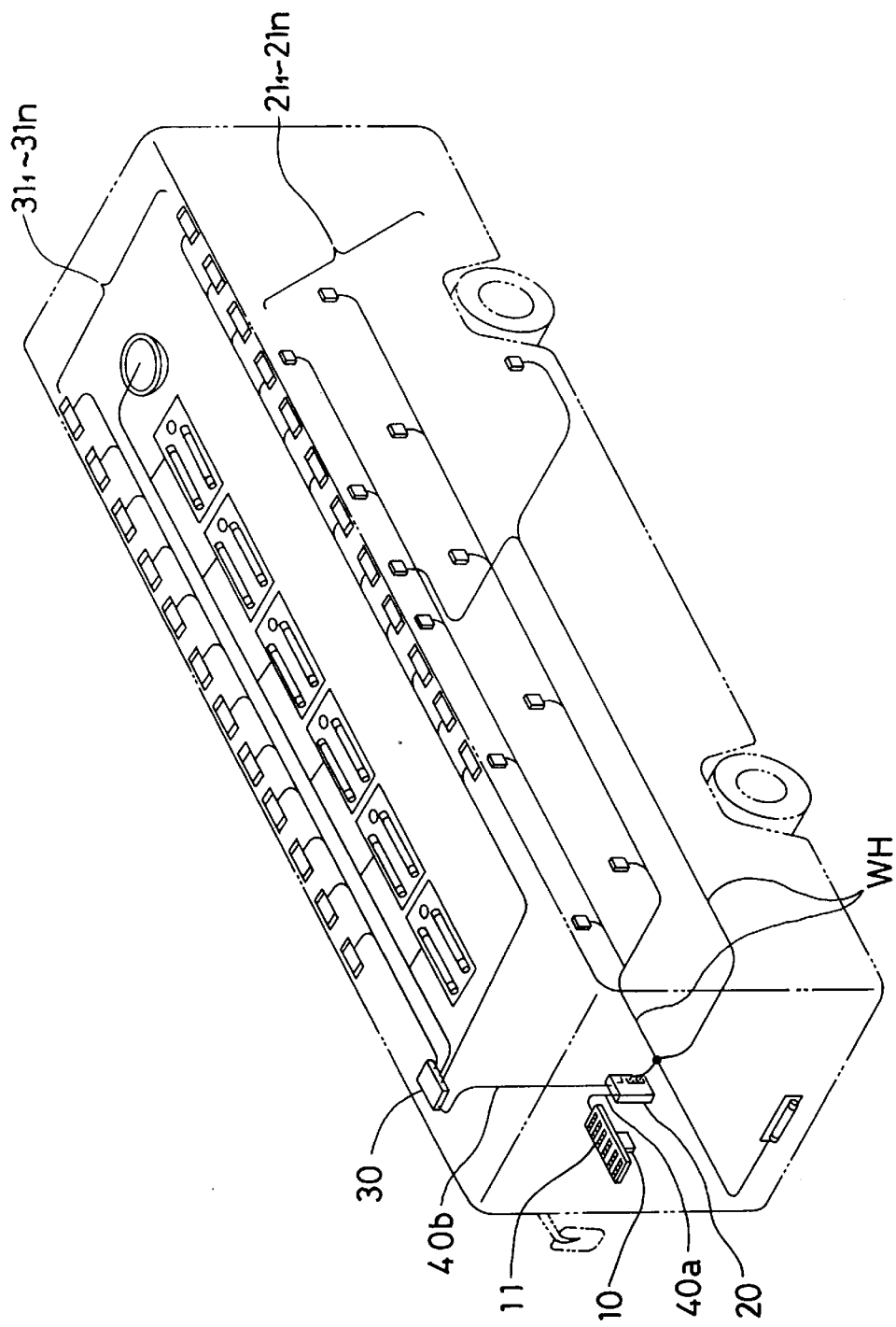
FIG. 3 is an illustration showing the layout relationships between the load drive units and loads in the multiplex communication system for a vehicle in FIG. 1.

The first load drive unit 20, which is fitted in the switch box 100 on the right of the driver's seat like the switch unit 10, controls the loads $21_1$, to $21n$ placed mainly on the floor as shown in FIG. 3 and connected by a general wire harness WH according to reception data from the switch unit 10. The second load drive unit 30, which is fitted in the ceiling part on the rear of the driver's seat, controls the loads $31_1$, to $31n$ placed mainly on the ceiling as shown in FIG. 3 and connected by a general wire harness WH according to multiplex data received from the switch unit 10 and the first load drive unit 20. It contains the dimming control circuit of incandescent and fluorescent lamps for controlling dimming in response to operations of the volumes disposed on the switch panel SP.

The multiplex line $40b$ for connecting both the first load drive unit 20 fitted in the switch box 100 and the second load drive unit 30 fitted in the ceiling part on the rear of the driver's seat is passed preferably through a pipe-like hollow column located between the floor face and the ceiling on the rear side of the driver's seat. The second load drive unit 30 controls the loads $31_1$, to $31n$ placed mainly on the ceiling and connected by the general wire harness WH. On the other hand, it is not necessary to arrange the wire harness WH for connecting the first load drive unit 20 placed on the floor and the loads $31_1$, to $31n$ fitted in the ceiling part. Therefore, the number of lines required to be passed through the pipe-like hollow column can decrease and wiring work is extremely easy to carry out.

Figure 4:
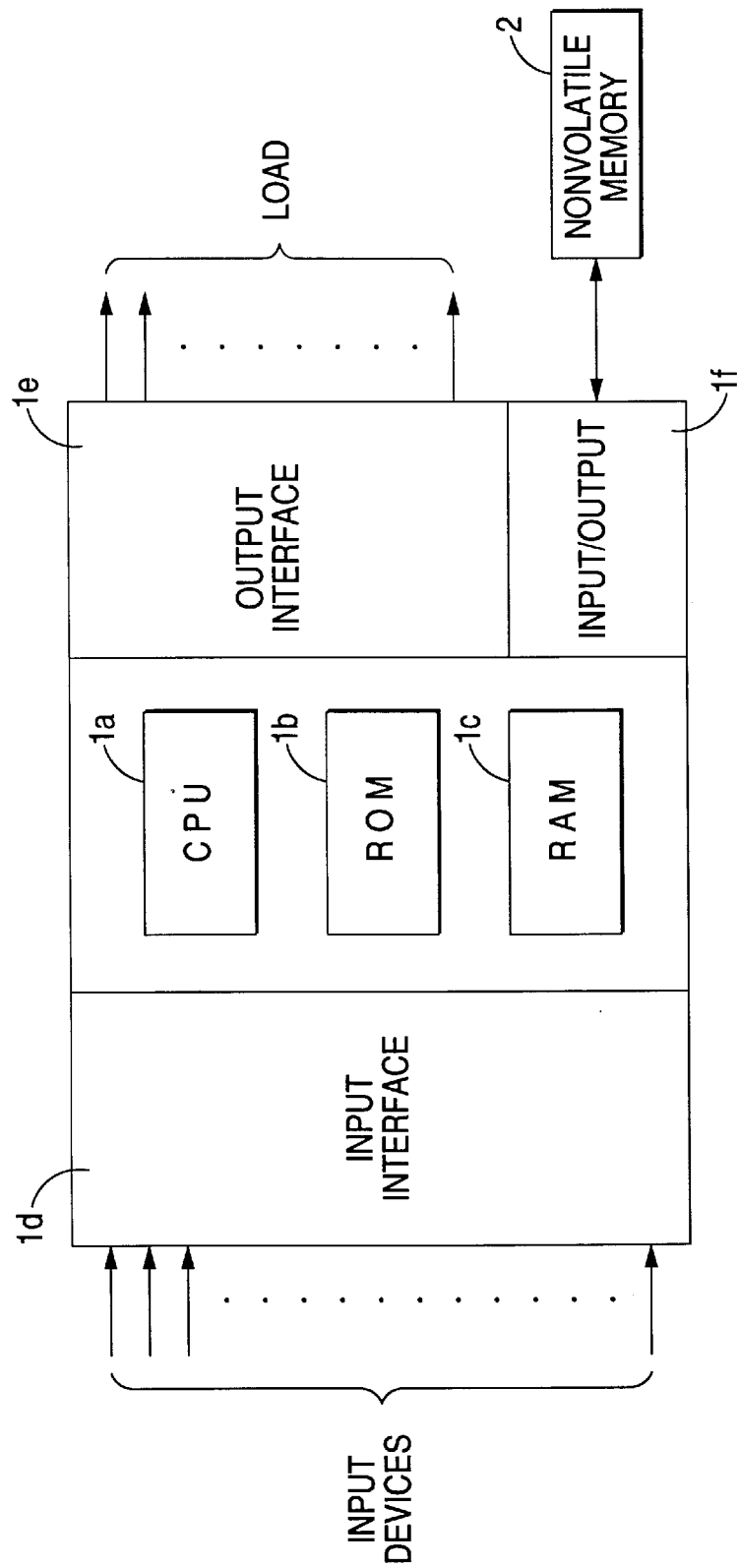
FIG. 4 is a block diagram showing a circuit configuration example of each unit in the multiplex communication system for a vehicle in FIG. 1.
Figure 7:
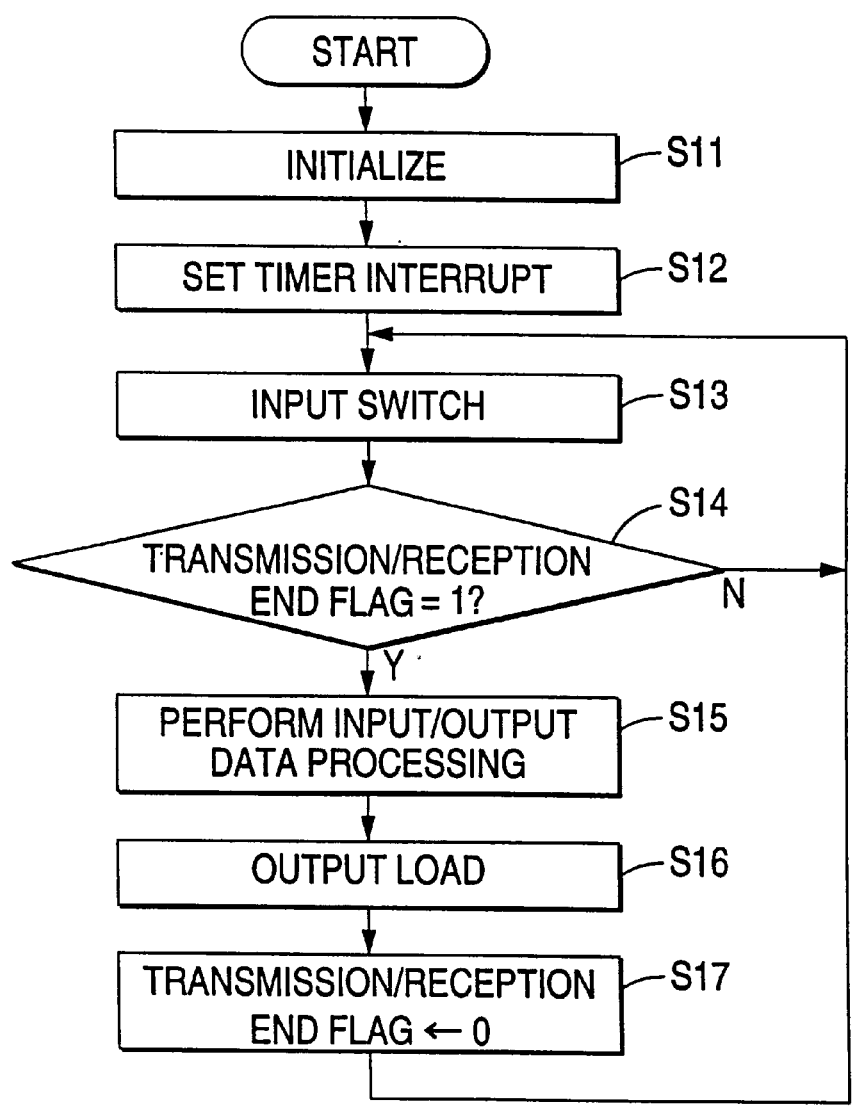
FIG. 7 is a flowchart showing a main routine executed by the CPU of a load drive unit A in accordance with a predetermined program.

As shown in FIG. 4, each unit is made of a one-chip microcomputer (COM) operating in accordance with a predetermined control program and contains a central processing unit (CPU) 1a, a read-only memory (ROM) 1b for storing the predetermined control program and fixed data, a random access memory (RAM) 1c used as a work area when a job determined by the control program is executed, an input interface 1d to which input devices such as switches and sensors are connected, an output interface 1e to which loads such as lamps and motors are connected, and an input/output interface 1f to which a nonvolatile memory 2 in which fixed data can be rewritten and can be held with no backup power supply is connected.

As shown in FIG. 5A, the RAM 1c in the first load drive unit 20 in formed with areas 1c1 to 1c7 for providing flags FLAG B, FLAG C, and FLAG D for checking timer time setting, flags RXB and RXC indicating the reception state from other control units, a transmission/reception end flag, and a timer. Tb, Tc, or Td seconds are selectively set in the timer area 1c7.

As shown in FIG. 5B, the RAM 1c in the switch unit 10 is formed with areas 1c1 to 1c7 for providing flags FLAG A, FLAG C, and FLAG D for checking timer time setting, flags RXA and RXC indicating the reception state from other control units, a transmission/reception end flag, and a timer. Tb, Tc, or Td seconds are selectively set in the timer area 1c7.

As shown in FIG. 5C, the RAM 1c in the second load drive unit 30 is formed with areas 1c1 to 1c7 for providing flags FLAG A, FLAG B, and FLAG D for checking timer time setting, flags RXA and RXB indicating the reception state from other control units, a transmission/reception end flag, and a timer. Tb, Tc, or Td seconds are selectively set in the timer area 1c7.

In the configuration, the operation of the units will be outlined with reference to FIGS. 6A to 6C.

The first load drive unit 20 starts transmission immediately after the completion of initialization of its CPU, and sets Tb seconds to the timer after the completion of the transmission, then enters a reception wait state. When the multiplex line is normal, the first load drive unit 20 receives data from the switch unit 10 before the timer interrupt of Tb seconds is made, and sets Tc seconds to the timer after the completion of the data reception from the switch unit 10, then enters a reception wait state. The first load drive unit 20 receives data from the second load drive unit 30 before the timer interrupt of Tc seconds is made, and sets Td seconds to the timer after the completion of the data reception from the second load drive unit 30, then starts signal processing. The first load drive unit 20 enters the timer interrupt of Td seconds after the termination of Td seconds, and starts transmission after the timer stops.

The switch unit 10 sets Ta seconds to the timer immediately after the completion of initialization of its CPU, then enters a reception wait state. When the multiplex line is normal, the switch unit 10 receives data from the first load drive unit 20 before the timer interrupt of Ta seconds is made, and starts transmission after the completion of the data reception from the first load drive unit 20. After the completion of the transmission, the switch unit 10 sets Tc seconds to the timer, then enters a reception wait state. The switch unit 10 receives data from the second load drive unit 30 before the timer interrupt of Tc seconds is made, and sets Td seconds to the timer after the completion of the data reception from the second load drive unit 30, then starts signal processing. The switch unit 10 enters the timer interrupt of Td seconds after the termination of Td seconds, and after the timer stops, sets Ta seconds to the timer, then enters a reception wait state.

The second load drive unit 30 sets Ta seconds to the timer immediately after the completion of initialization of its CPU, then enters a reception wait state. When the multiplex line is normal, the second load drive unit 30 receives data from the first load drive unit 20 before the timer interrupt of Tb seconds, and sets Tb seconds to the timer after the completion of the data reception from the first load drive unit 20, then enters a reception wait state. The second load drive unit 30 receives data from the switch unit 10 before the timer interrupt of Tb seconds is made, and sets Tc seconds to the timer after the completion of the data reception from the switch unit 10, then starts transmission. After the completion of the transmission, the second load drive unit 30 sets Td seconds to the timer, then starts signal processing. The second load drive unit 30 enters the timer interrupt of Td seconds after the termination of Td seconds, and after the timer stops, sets Ta seconds to the timer, then enters a reception wait state.

The outlined operation will be described in detail with reference to flowcharts in FIGS. 7 to 15 showing jobs executed by the CPUs of the units. As shown in the flowcharts in FIGS. 7 to 9, the CPU of the first load drive unit 20 starts the operation when the power is turned on, and initializes the flags FLAG B, FLAG C, and FLAG D for checking timer time setting, the flags RXB and RXC indicating the reception state from other units, the transmission/reception end flag, and the timer area at the first step of the main routine, S11. After this, it goes to step S12 and sets a timer interrupt, then goes to step S13 and inputs the state of the input devices connected to the CPU. After execution of step S13, the CPU goes to step S14 and determined whether or not the transmission/reception end flag is 1. If the flag is not 1, the CPU returns to step S13. When the interrupt time set at step S12 is reached while the CPU executes steps S13 and S14 repeatedly, the CPU executes a timer interrupt service shown in FIG. 8.

In the timer interrupt service, at the first step S11, the CPU determines whether or not the flag FLAG D is 1. If the flag is not 1, the CPU goes to step S112 and determines whether or not the flag FLAG B is 1. If the flag is not 1, the CPU goes to step S113 and determines whether or not the flag FLAG C is 1. If the flag is not 1, the CPU goes to step S114 and transmits the state input at step S13 to the multiplex line 40. After this, the CPU goes to step S115 and sets Tb seconds to the timer, sets 0 to the flag FLAG D at step S116, and sets 1 to the flag FLAG B at step S117, then returns to the former step of the main routine and again executes steps S13 and S14 repeatedly. Upon reception from another unit while the CPU executes steps S13 and S14 repeatedly, the CPU executes a reception interrupt service shown in FIG. 9.

In the reception interrupt service, at the first step S131, the CPU performs the reception operation and at step S132, determines whether or not reception is from the switch unit 20. If the determination at step S132 is YES, the CPU goes to step S133 and sets Tc seconds to the timer. After this, the CPU goes to step S134 and sets 0 to the flag FLAG B, then goes to step S135 and sets 1 to the flag FLAG C. Further, it goes to step S136 and sets 0 to the flag RXB, then returns to the former step of the main routine and again executes steps S13 and S14 repeatedly. Upon reception from another unit while the CPU executes steps S13 and S14 repeatedly, the CPU executes the reception interrupt service shown in FIG. 9.

If the determination at step S132 of the reception interrupt routine is NO, the CPU goes to step S137 and determines whether or not the reception is from the second control unit 30. If the determination at step S137 is YES, the CPU goes to step S138 and sets Td seconds to the timer. After this, the CPU goes to step S139 and sets 0 to the flag FLAG C, then goes to step S140 and sets 1 to the flag FLAG D. Further, it goes to step S141 and sets 0 to the flag RXC, then goes to step S142 and sets 1 to the transmission/reception end flag, then returns to the former step of the main routine and again executes steps S13 and S14 repeatedly. Since the transmission/reception end flag is set with 1 at step S142, the determination at step S14 becomes YES and the CPU goes to step S15 at which the CPU performs input/output data processing. According to the processing result, the CPU outputs a signal to load at step S16, goes to step S17 and sets 0 to the transmission/reception end flag, then returns to step S13.

In this example, the multiplex line 40 is normal and data is received from the switch unit 10 and the second load drive unit 30 within Tb seconds set in the timer at step S115 and Tc seconds set in the timer at step S133, respectively. If no data is received within a time set in the timer, the timer interrupt routine in FIG. 8 is started.

When steps S13 and S14 are executed repeatedly after the timer is set with Tb seconds at step S115, if Tb seconds set in the timer have elapsed, the timer interrupt routine is started. When the timer interrupt routine is executed, the determination at step S111 becomes NO and control goes to step S112 at which the CPU determines whether or not the flag FLAG B is 1. Since the flag FLAG B is set with 1 at step S117, the determination at step S112 becomes YES and control goes to step S118 at which the CPU sets Tc seconds to the timer. Then, it goes to step S119 and sets 0 to the FLAG B, then goes to step 120. At step 120, the CPU sets 1 to the flag FLAG C, then goes to step S121 and sets 1 to the flag RXB, then returns to the former step of the main routine and executes steps S13 and S14 repeatedly.

Figure 8:
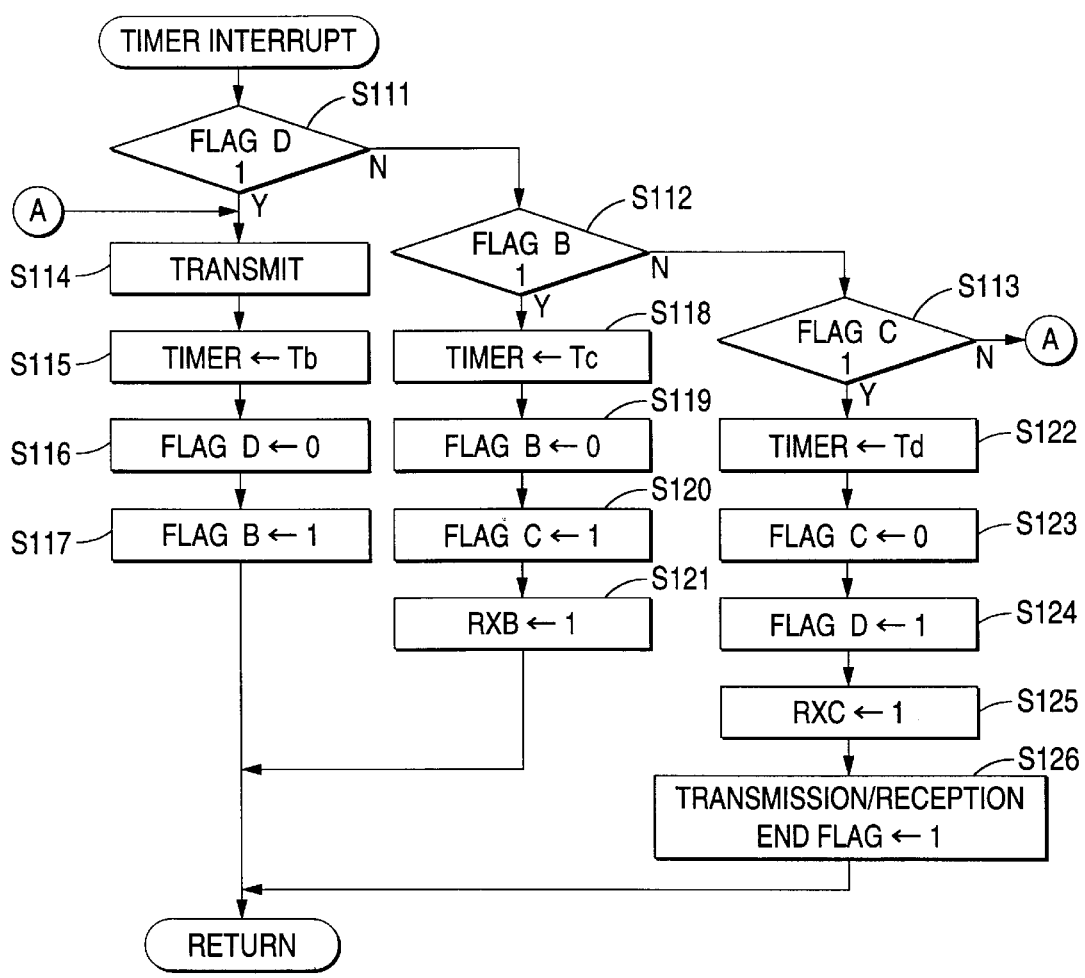
FIG. 8 is a flowchart showing a timer interrupt routine executed by the CPU of the load drive unit A in accordance with a predetermined program.
Figure 9:
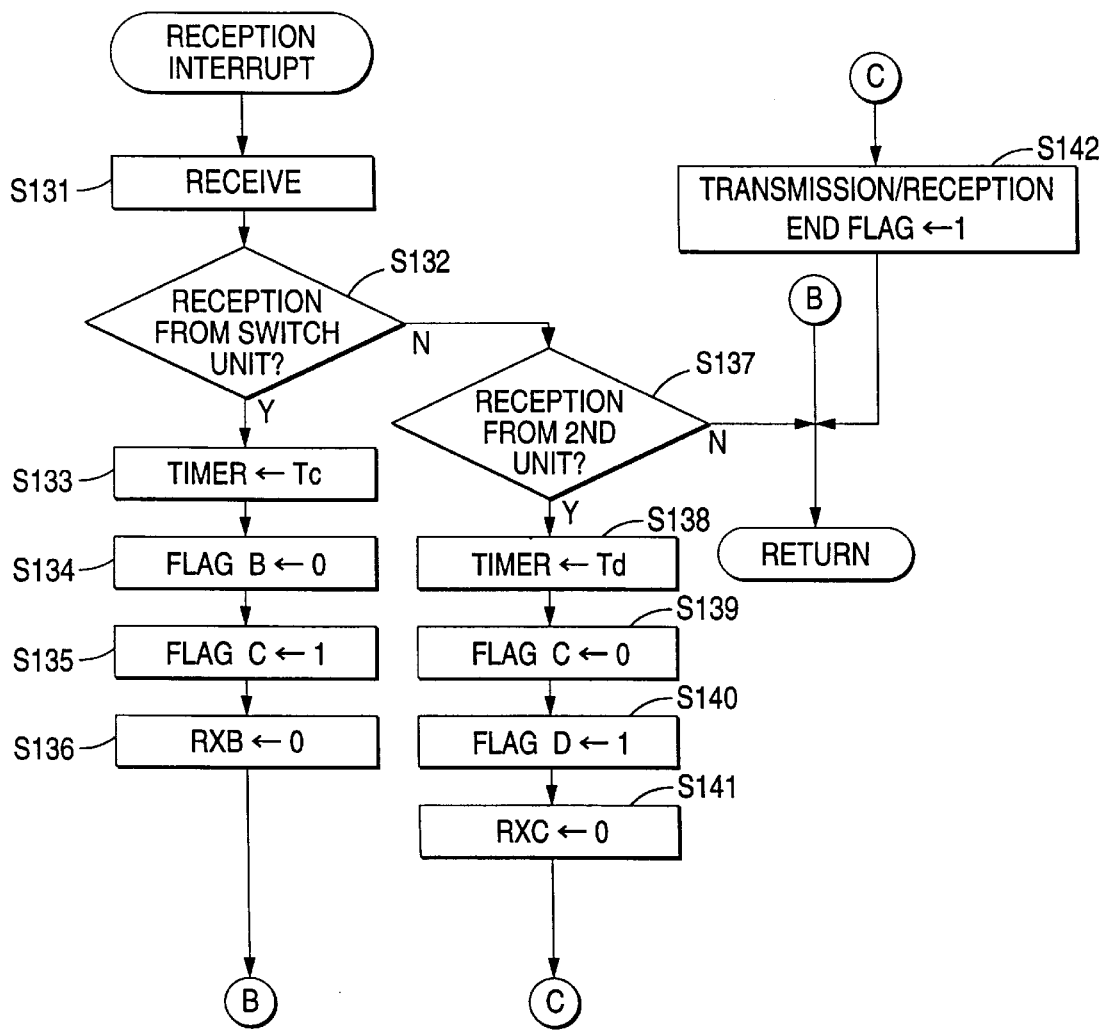
FIG. 9 is a flowchart showing a reception interrupt routine executed by the CPU of the load drive unit A in accordance with a predetermined program.

When steps S13 and S14 are executed repeatedly after the timer is set with Tc seconds at step S133, if Tc seconds set in the timer have elapsed, the timer interrupt routine in FIG. 8 is started. When the timer interrupt routine is executed, the determinations at step S111 and S112 become No and control goes to step S113 at which the CPU determines whether or not the flag FLAG C is 1. Since the flag FLAG C is set with 1 at step S135, the determination at step S113 becomes YES and control goes to step S122 at which the CPU sets Td seconds to the timer. Then, it goes to step S123 and sets 0 to the FLAG C, then goes to step 124. At step 124, the CPU sets 1 to the flag FLAG D, then goes to step 125 and sets 1 to the flag RXC. After this, the CPU goes to step S126 and sets 1 to the transmission/reception end flag, then returns to the former step of the main routine and repeats steps S13 and S14. Since the transmission/reception end flag is set with 1 at step S126, the determination at step S14 becomes YES and the CPU goes to step S15 at which the CPU performs input/output data processing. According to the processing result, the CPU outputs a signal to load at step S16, goes to step S17 and sets 0 to the transmission/ reception end flag, then returns to step S13.

As described above, when reception from the switch unit 10 or the second load drive unit 30 is not within the predetermined time, the first load drive unit 20 can also perform predetermined operation.

Figure 10:
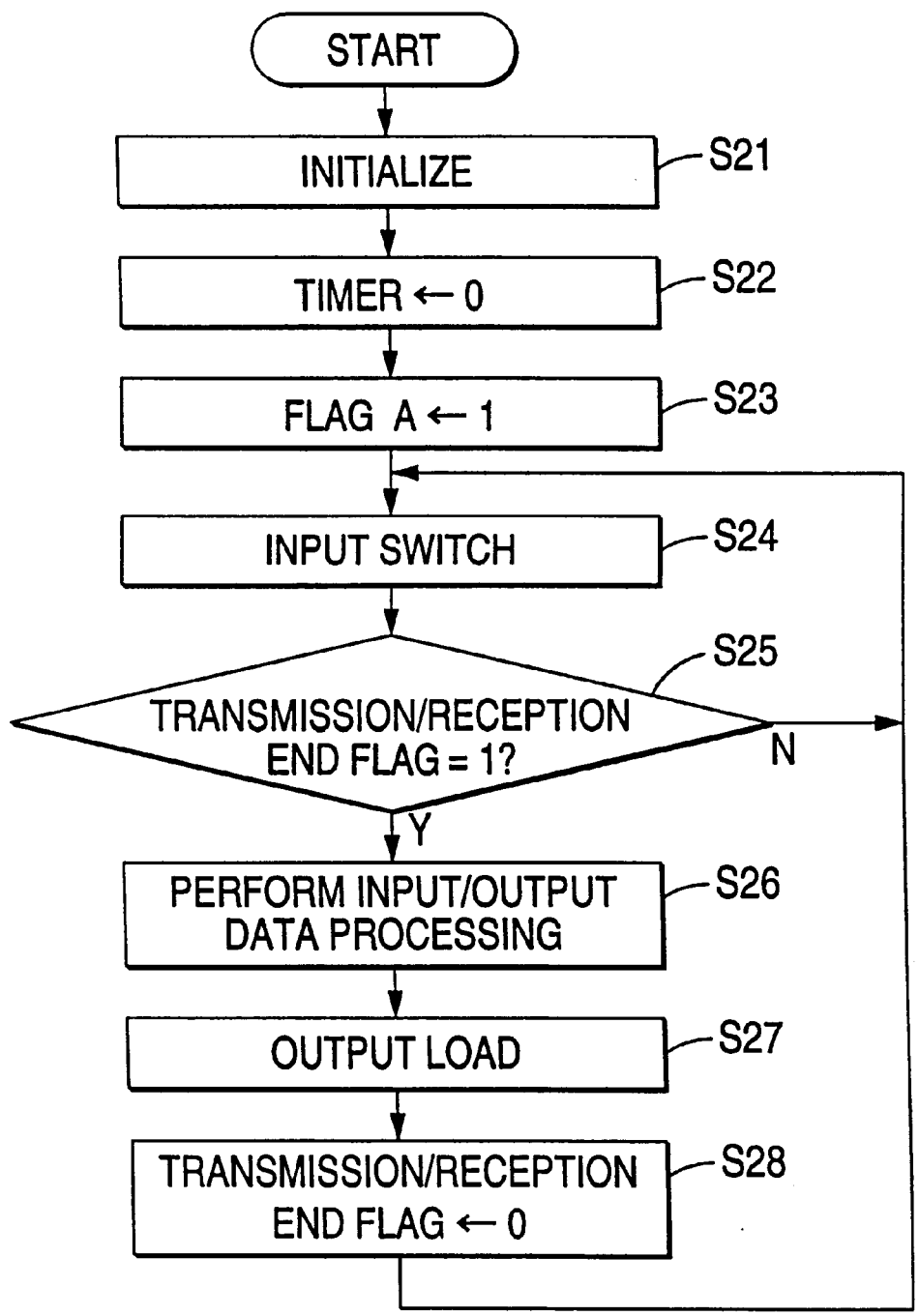
FIG. 10 is a flowchart showing a main routine executed by the CPU of a switch unit in accordance with a predetermined program.
Figure 11:
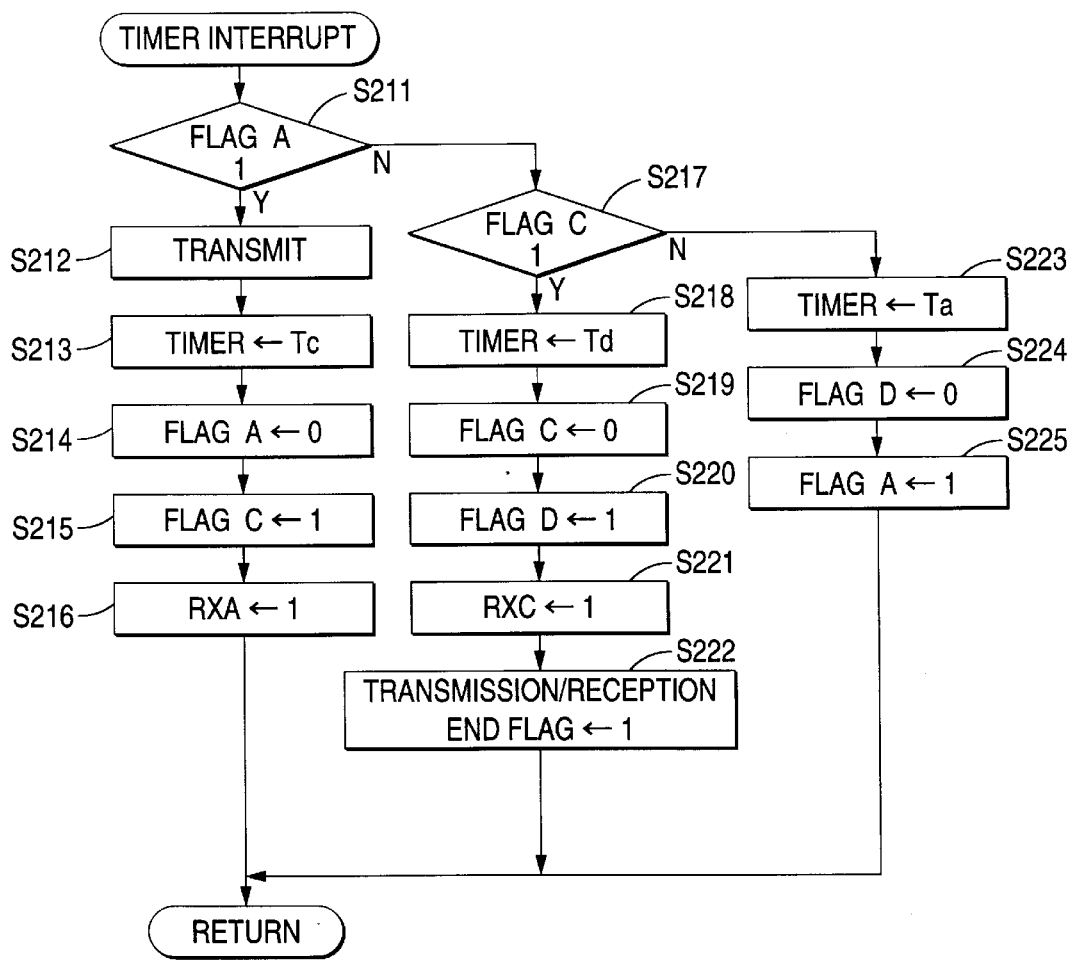
FIG. 11 is a flowchart showing a timer interrupt routine executed by the CPU of the switch unit in accordance with a predetermined program.
Figure 12:
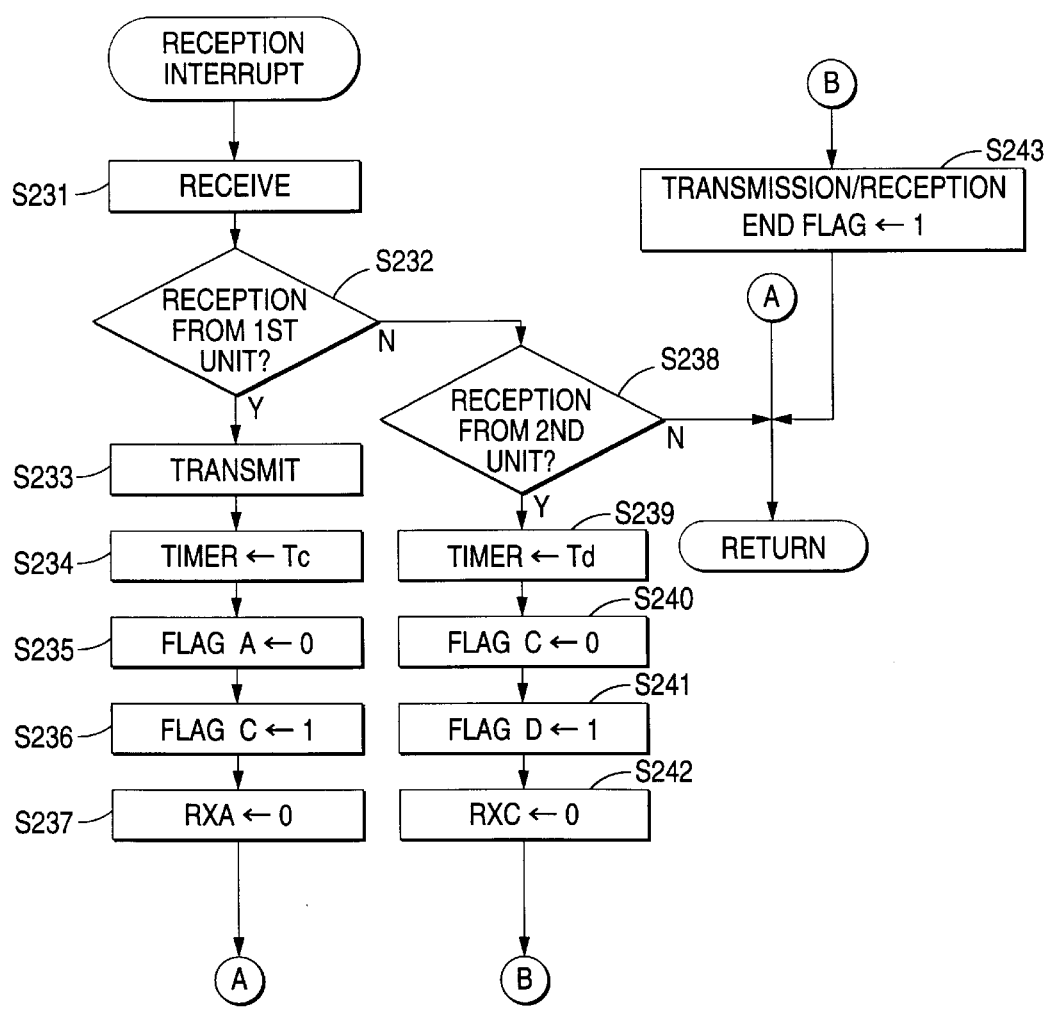
FIG. 12 is a flowchart showing a reception interrupt routine executed by the CPU of the switch unit in accordance with a predetermined program.

As shown in the flowcharts in FIGS. 10 to 12, the CPU of the switch unit 10 starts the operation when the power is turned on, and initializes the flags FLAG B, FLAG C, and FLAG D for checking timer time setting, the flags RXB and RXC indicating the reception state from other units, the transmission/reception end flag, and the timer area at the first step of the main routine, S21. After this, it goes to step S22 and sets Ta seconds to the timer, then goes to step S23 and sets 1 to the flag FLAG A. After this, the CPU goes to step S24 and inputs the state of the switches of the input devices connected to the CPU. After execution of step S24, the CPU goes to step S25 and determines whether or not the transmission/reception end flag is 1. If the flag is not 1, the CPU returns to step S24. Upon reception from another unit while the CPU executes steps S24 and S25 repeatedly, the CPU executes a reception interrupt service shown in FIG. 12.

In the reception interrupt service, at the first step S231, the CPU performs the reception operation and at step S232, determines whether or not reception is from the first load drive unit 20. If the determination at step S232 is YES, the CPU goes to step S233 and performs transmission, then goes to step S234 and sets Tc seconds to the timer. After this, the CPU goes to step S235 and sets 0 to the flag FLAG A, then goes to step S236 and sets 1 to the flag FLAG C. Further, it goes to step S237 and sets 0 to the flag RXA, then returns to the former step of the main routine and again executes steps S24 and S25 repeatedly. Upon reception from another unit while the CPU executes steps S24 and S25 repeatedly, the CPU executes the reception interrupt service shown in FIG. 12.

If the determination at step S232 of the reception interrupt routine is NO, the CPU goes to step S238 and determines whether or not the reception is from the second load drive unit 30. If the determination at step S238 is YES, the CPU goes to step S239 and sets Td seconds to the timer. After this, the CPU goes to step S240 and sets 0 to the flag FLAG C, then goes to step S241 and sets 1 to the flag FLAG D. Further, it goes to step S242 and sets 0 to the flag RXC, then goes to step S243 and sets 1 to the transmission/reception end flag, then returns to the former step of the main routine and again repeats steps S24 and S25. Since the transmission/ reception end flag is set with 1 at step S243, the determination at step S25 becomes YES and the CPU goes to step S26 at which the CPU performs input/output data processing. According to the processing result, the CPU outputs a signal to load at step S27, goes to step S28 and sets 0 to the transmission/reception end flag, then returns to step S24.

In this example, the multiplex line 40 is normal and data is received from the first and second load drive units 20 and 30 within Ta seconds set in the timer at step S22 and Tc seconds not in the timer at step S234 respectively. If no data is received within a time set in the timer, a timer interrupt routine shown in FIG. 11 is started.

When steps S24 and S25 are executed repeatedly after the timer is set with Ta seconds at step S22, if Ta seconds set in the timer have elapsed, the timer interrupt routine in FIG. 11 is started. In the timer interrupt service, at the first step S211, the CPU determines whether or not the flag FLAG A is 1. Since the flag FLAG A is set with 1 at step S23, the determination at step S211 becomes YES and the CPU goes to step S212 and transmits the switch state input at step S24 to the multiplex line 40. After this, the CPU goes to step S213 and sets Tc seconds to the timer, sets 0 to the flag FLAG A at step S214, and sets 1 to the flag FLAG C at step S215, then goes to step S216 and sets 1 to the flag RXA, then returns to the former step of the main routine and again executes steps S24 and S25 repeatedly.

When steps S24 and S25 are executed repeatedly after the timer is set with Tc seconds at step S213, if Tc seconds set in the timer have elapsed, the timer interrupt routine in FIG. 11 is started. When the timer interrupt routine is executed, the determination at step S211 becomes NO and control goes to step S217 at which the CPU determines whether or not the flag FLAG C is 1. Since the flag FLAG C is set with 1 at step S215, the determination at step S217 becomes YES and control goes to step S218 at which the CPU sets Td seconds to the timer. Then, it goes to step S219 and sets 0 to the FLAG C, then goes to step 220. At step 220, the CPU sets 1 to the flag FLAG D, then goes to step S221 and sets 1 to the flag RXC. After this, the CPU goes to step S222 and sets 1 to the transmission/reception end flag, then returns to the former step of the main routine and repeats steps S24 and S25. Since the transmission/reception end flag is set with 1 at step S222, the determination at step S25 becomes YES and the CPU goes to step S26 at which the CPU performs input/output data processing. According to the processing result, the CPU outputs a signal to load at step S27, goes to step S28 and sets 0 to the transmission/reception end flag, then returns to step S24.

Further, when steps S24 and S25 are executed repeatedly after the timer is set with Td seconds at step S218, if Td seconds set in the timer have elapsed, the timer interrupt routine is started. When the timer interrupt routine is executed, the determinations at steps S211 and S217 are NO and control goes to step S223 at which the CPU sets Ta seconds to the timer. Then, it sets 0 to the flag FLAG D at step S224, and sets 1 to the flag FLAG A at step S225, then returns to the former step of the main routine and repeats steps S24 and S25.

As described above, when reception from one of the first and second load drive units 20 and 30 is not within the predetermined time, the switch unit 10 can also perform predetermined operation.

Figure 13:
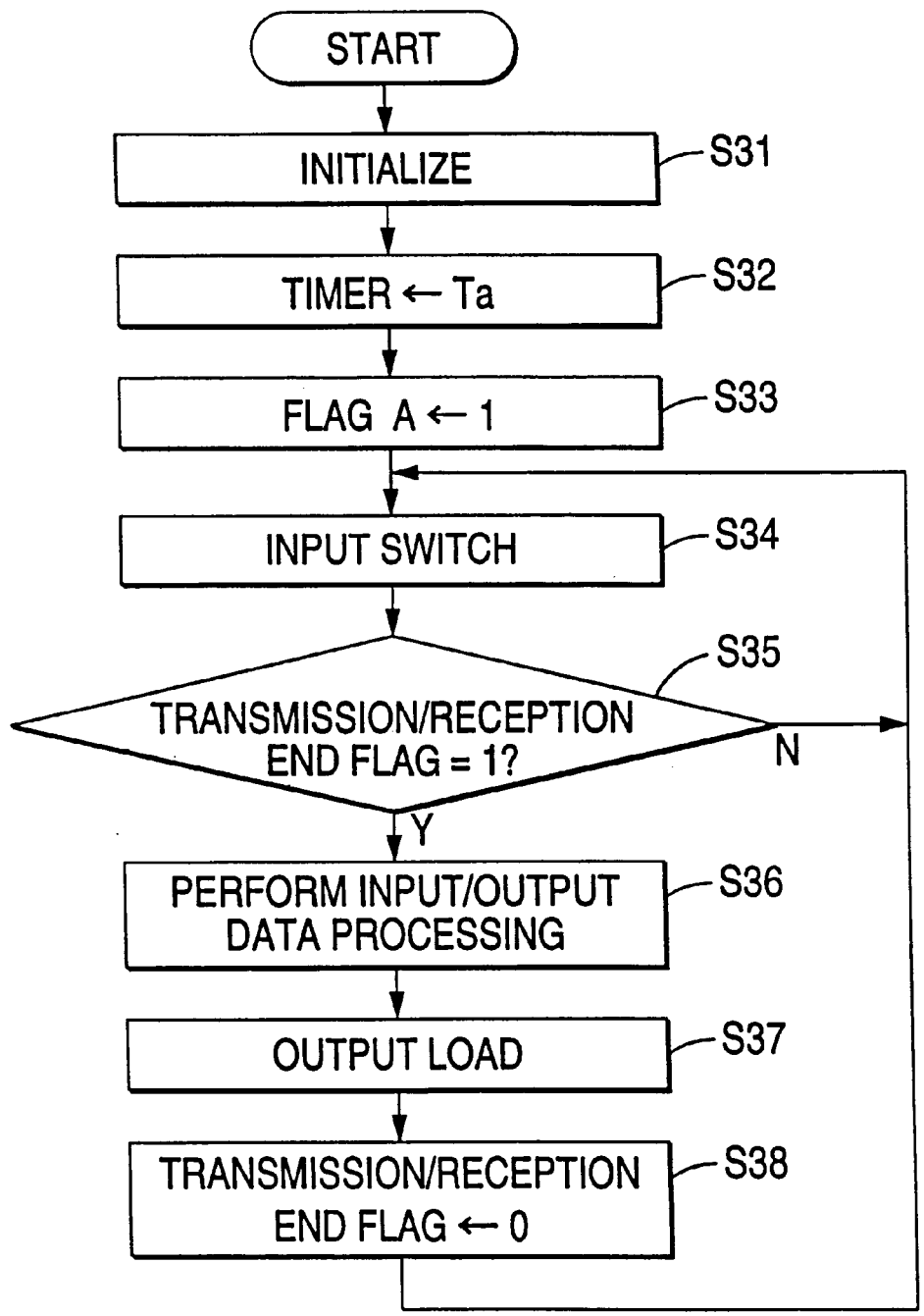
FIG. 13 is a flowchart showing a main routine executed by the CPU of a load drive unit B in accordance with a predetermined program.
Figure 14:
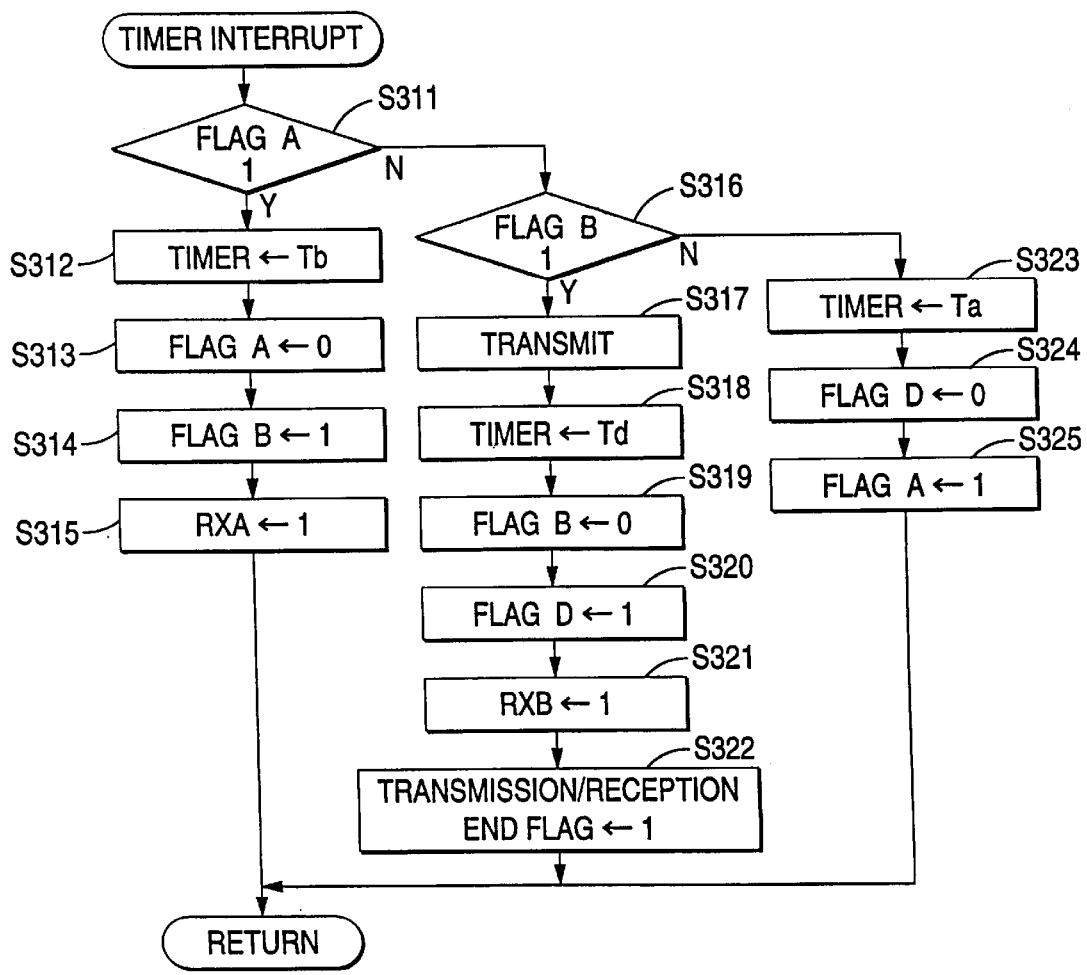
FIG. 14 is a flowchart showing a timer interrupt routine executed by the CPU of the load drive unit B in accordance with a predetermined program.
Figure 15:
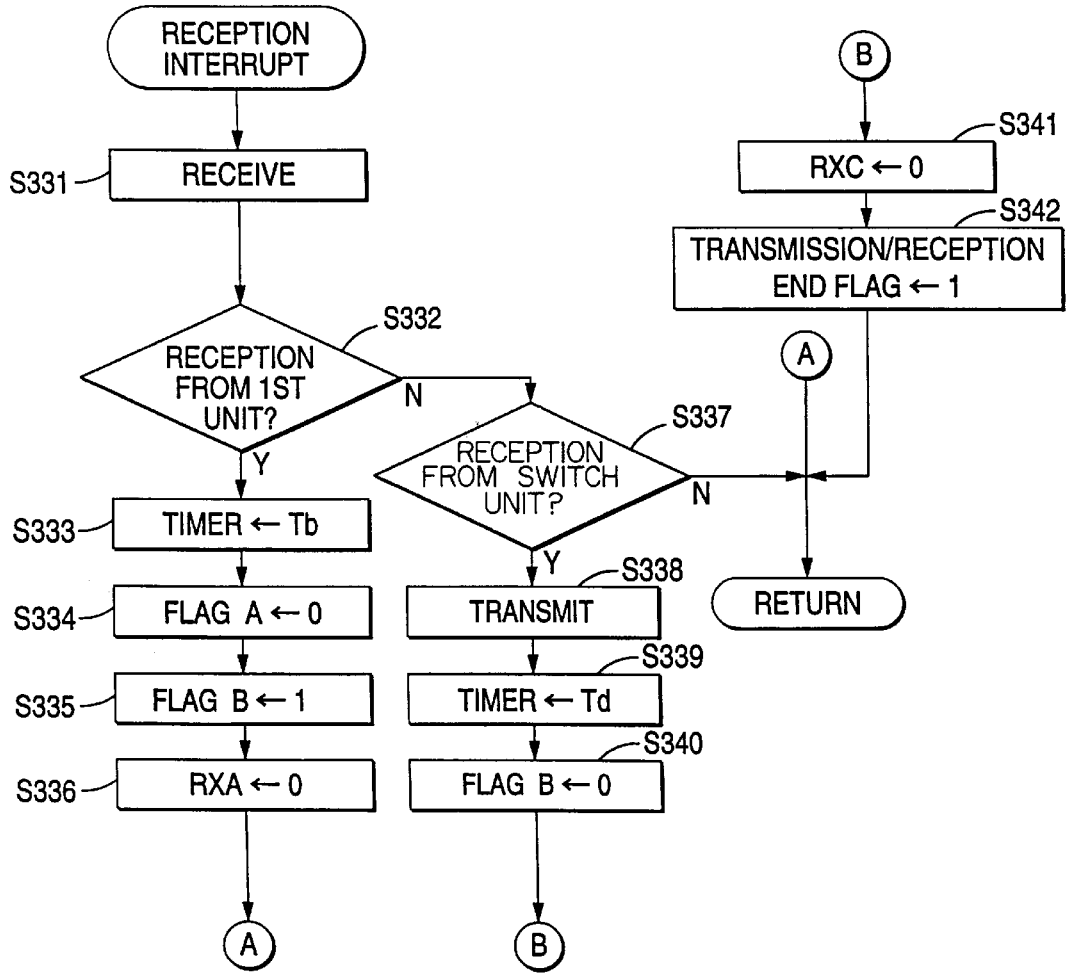
FIG. 15 is a flowchart showing a reception interrupt routine executed by the CPU of the load drive unit B in accordance with a predetermined program.

As shown in the flowcharts in FIGS. 13 to 15, the CPU of the second load drive unit 30 starts the operation when the power is turned on, and initializes the flags FLAG B, FLAG A, and FLAG D for checking timer time setting, the flags RXB and RXA indicating the reception state from other units, the transmission/reception end flag, and the timer area at the first step of the main routine, S31. After this, it goes to step S32 and sets Ta seconds to the timer, then goes to step S33 and sets 1 to the flag FLAG A. After this, the CPU goes to step S34 and inputs the state of the input devices connected to the CPU. After execution of step S34, the CPU goes to step S35 and determines whether or not the transmission/reception and flag is 1. If the flag is not 1, the CPU returns to step S34. Upon reception from another unit while the CPU executes steps S34 and S35 repeatedly, the CPU executes a reception interrupt service shown in FIG. 15.

In the reception interrupt service, at the first step S331, the CPU performs the reception operation and at step S332, determines whether or not reception is from the first load drive unit 20. If the determination at step S332 is YES, the CPU goes to step S333 and sets Tb seconds to the timer. After this, the CPU goes to step S334 and sets 0 to the flag FLAG A, then goes to step S335 and sets 1 to the flag FLAG B. Further, it goes to step S336 and sets 0 to the flag RXA, then returns to the former step of the main routine and again executes steps S34 and S35 repeatedly. Upon reception from another unit while the CPU executes steps S34 and S35 repeatedly, the CPU executes the reception interrupt service shown in FIG. 15.

If the determination at step S332 of the reception interrupt routine is NO, the CPU goes to step S337 and determines whether or not the reception is from the switch unit 10. If the determination at step S337 is YES, the CPU goes to step S338 and performs transmission, then goes to step S339 and sets Td seconds to the timer. After this, the CPU goes to step S340 and sets 0 to the flag FLAG B, then goes to step S341 and sets 0 to the flag RXC. Further, it goes to step S342 and sets 1 to the transmission/reception end flag, then returns to the former step of the main routine and again repeats steps S34 and S35. Since the transmission/reception end flag is set with 1 at step S342, the determination at step S35 becomes YES and the CPU goes to step S36 at which the CPU performs input/output data processing. According to the processing result, the CPU outputs a signal to load at step S37, goes to step S38 and sets 0 to the transmission/reception end flag, then returns to step S34.

In this example, the multiplex line 40 is normal and data is received from the first load drive unit 20 and the switch unit 10 within Ta seconds set in the timer at step S32 and Tb seconds set in the timer at step S333 respectively. If no data is received within a time set in the timer, a timer interrupt routine shown in FIG. 14 is started.

When steps S34 and S35 are executed repeatedly after the timer is set with Ta seconds at step S32, if Ta seconds set in the timer have elapsed, the timer interrupt routine is started. In the timer interrupt service, at the first step S311, the CPU determines whether or not the flag FLAG A is 1. Since the flag FLAG A is set with 1 at step S33, the determination at step S311 becomes YES and the CPU goes to step S312 and sets Tb seconds to the timer. Then, it sets 0 to the flag FLAG A at step S313 and sets 1 to the flag FLAG B at step S314. After this, the CPU goes to step S315 and sets 1 to the flag RXA, then returns to the former step of the main routine and again executes steps S34 and S35 repeatedly.

When steps S34 and S35 are executed repeatedly after the timer is set to Tb seconds at step S312, if Tb seconds set in the timer have elapsed, the timer interrupt routine in FIG. 14 is started. When the timer interrupt routine is executed, the determination at step S311 becomes NO and control goes to step S316 at which the CPU determines whether or not the flag FLAG B is 1. Since the flag FLAG B is set with 1 at step S314, the determination at step S316 becomes YES and control goes to step S317 at which the CPU performs transmission. Then, it goes to step S318 and sets Td seconds to the timer. After this, the CPU goes to step S319 and sets 0 to the FLAG B, then goes to step 320. At step 320, the CPU sets 1 to the flag FLAG D, then goes to step S321 and sets 1 to the flag RXB. After this, the CPU goes to step S322 and sets 1 to the transmission/reception end flag, then returns to the former step of the main routine and repeats steps S34 and S35. Since the transmission/reception end flag is set with 1 at step S322, the determination at step S35 becomes YES and the CPU goes to step S36 at which the CPU performs input/output data processing. According to the processing result, the CPU outputs a signal to load at step S37, goes to step S38 and sets 0 to the transmission/reception end flag, then returns to step S34.

Further, when steps S34 and S35 are executed repeatedly after the timer is set with Td seconds at step S318, if Td seconds set in the timer have elapsed, the timer interrupt routine is started. When the timer interrupt routine is executed, the determinations at steps S311 and S316 are NO and control goes to step S323 at which the CPU sets Ta seconds to the timer. Then, it sets 0 to the flag FLAG D at step S324, and sets 1 to the flag FLAG A at step S325, then returns to the former step of the main routine and repeats steps S34 and S35.

As described above, even when reception from the first load drive unit 20 or the switch unit 10 is not within the predetermined time, the second load drive unit 30 can also perform predetermined operation.

According to the present invention, the multiplex lines connect the second load drive unit and the switch unit which inputs the operation signals of the operation switches integrated into the switch box at the side of the bus driver's seat and generates multiplex data. Further, the loads to be controlled which are placed mainly on the ceiling are connected by the wire harness to the second load drive unit fitted in the ceiling part. The wire harness for connecting the load drive unit and the loads placed on the ceiling is mainly wired in ceiling parts so that they need not be wired between the ceiling and floor. Therefore, the wire harnesses can be formed with high assembling performance or productivity even in a bus vehicle mounting a large number of loads placed on the ceiling.

Particularly, a separate place for placing the first load unit need not be provided. The multiplex lines connecting the first and second load drive units and the switch unit can be made the shortest. Thus, from this point, the high assembling performance or productivity of the wire harnesses can also be furthermore improved in a bus vehicle with a large number of loads placed on the ceiling.

What is claimed is:

1. A multiplex communication system for a vehicle comprising:

a plurality of loads disposed in the vehicle and connected to a wire harness;

a central switch for inputting signals to operate the loads and generating multiplex data;

a first load drive unit for controlling the loads placed mainly on a floor of the vehicle;

a second load drive unit for controlling the loads placed mainly on a ceiling of the vehicle;

a multiplex line interconnecting the central switch, the first load drive unit and the second load drive unit, and transmitting the multiplex data generated by the central switch to the first and second load drive units to execute a multiplex communication, each of the first and second load drive units controlling the loads in accordance with the multiplex data received through the multiplex line from the central switch;

wherein each of the first and second load drive units and the switch unit comprises a processor and a memory, the processor executing the multiplex communication corresponding to predetermined times in accordance with data stored in the memory, the multiplex communication sharing selectively one of transmitting and receiving status data received from the loads, transmitting and receiving the multiplex data, and controlling the loads and inputting the signals;

wherein said switch, said first load drive unit, and said second load drive unit comprise first through third control units, respectively, and wherein each memory of said first through third control units stores data corresponding to flags indicating timer time setting conditions, flags corresponding to transmitting or reception states for the other two control units, a transmission and reception end flag for the respective control unit and a timer, and wherein each processor of the respective control unit executes multiplexing data in accordance with said timer flags, transmission and reception state flags, transmission and reception end flag, and timer.

2. A multiplex communication system for a vehicle comprising:

a plurality of loads disposed in the vehicle and connected to a wire harness;

a central switch for inputting signals to operate the loads and generating multiplex data;

a first load drive unit for controlling the loads placed mainly in a first section of the vehicle;

a second load drive unit for controlling the loads placed mainly in a second section of the vehicle;

a multiplex line interconnecting the central switch, the first load drive unit and the second load drive unit, and transmitting the multiplex data generated by the central switch to the first and second load drive units to execute a multiplex communication, each of the first and second load drive units controlling the loads in accordance with the multiplex data received through the multiplex line from the central switch, wherein each of the first and second load drive units and the switch comprises a processor and a memory, the processor executing the multiplex communication corresponding to predetermined times in accordance with data stored in the memory, the multiplex communication sharing selectively one of transmitting and receiving status data received from the loads, transmitting and receiving the multiplex data, and controlling the loads and inputting the signals, wherein said switch, said first load drive unit, and said second load drive unit comprise first through third control units, respectively, and wherein each memory of said first through third control units stores data corresponding to flags indicating timer time setting conditions, flags corresponding to transmitting or reception states for the other two control units, a transmission and reception end flag for the respective control unit and a timer, and wherein each processor of the respective control unit executes multiplexing data in accordance with said timer flags, transmission and reception state flags, transmission and reception end flag, and timer.

* * * * *